US008436658B1

(12) United States Patent
Black (10) Patent No.: US 8,436,658 B1
(45) Date of Patent: May 7, 2013

(54) METHOD AND APPARATUS FOR SIGNALING CHARACTERISTICS OF A TRANSMITTED SIGNAL

(75) Inventor: William C. Black, Ames, IA (US)

(73) Assignee: Xilinx, Inc., San Jose, CA (US)

( * ) Notice: Subject to any disclaimer, the term of this patent is extended or adjusted under 35 U.S.C. 154(b) by 1435 days.

(21) Appl. No.: 12/061,581

(22) Filed: Apr. 2, 2008

Related U.S. Application Data

(62) Division of application No. 10/444,913, filed on May 23, 2003, now Pat. No. 7,379,517.

(51) Int. Cl.
*H03K 19/0175* (2006.01)

(52) U.S. Cl.
USPC ............... 326/83; 326/26; 326/115; 326/127

(58) Field of Classification Search ................... 326/115, 326/121
See application file for complete search history.

(56) References Cited

U.S. PATENT DOCUMENTS

| | | | |
|---|---|---|---|
| 5,631,928 A | | 5/1997 | Hossner |
| 5,734,272 A * | | 3/1998 | Belot et al. ..................... 326/126 |
| 5,760,717 A | | 6/1998 | Scholz |
| 6,850,649 B1 | | 2/2005 | Malvar |
| 6,930,619 B2 | | 8/2005 | Shim et al. |
| 7,352,207 B2 * | | 4/2008 | Garlapati et al. ............... 326/68 |
| 7,564,270 B1 * | | 7/2009 | Zhang et al. ................... 326/127 |
| 2003/0085736 A1 * | | 5/2003 | Tinsley et al. .................. 326/81 |
| 2003/0201802 A1 * | | 10/2003 | Young ........................... 327/108 |
| 2004/0028145 A1 * | | 2/2004 | Katta et al. ..................... 375/257 |
| 2004/0130467 A1 | | 7/2004 | Nakagawa et al. |
| 2006/0125532 A1 * | | 6/2006 | Chou ............................. 327/112 |
| 2006/0158223 A1 * | | 7/2006 | Wang et al. ..................... 326/86 |
| 2008/0218201 A1 * | | 9/2008 | Cranford et al. ................ 326/34 |
| 2011/0210774 A1 * | | 9/2011 | Behel ............................. 327/164 |

OTHER PUBLICATIONS

U.S. Appl. No. 12/061,579, filed Apr. 2, 2008, Black.
Benani, A. Mouaki et al., "Comparison of Carrier Recovery Techniques in M-QAM Digital Communication Systems,"*Proceedings of the 2000 Canadian Conference on Electrical and Computer Engineering*, Mar. 7-10, 2000, vol. 1, pp. 73-77, Halifax, Nova Scotia, Canada.
Chen, Dao-Long et al., "A 1.25Gb/s, 460mW CMOS Transceiver for Serial Data Communication," *Proceedings of the 1997 IEEE International Solid-State Circuits Conference (ISSCC'97)*, Feb. 6-8, 1997, Paper FP 15.3, pp. 242-243 and 465, San Francisco, California, USA.

(Continued)

*Primary Examiner* — Jany Tran
(74) *Attorney, Agent, or Firm* — Michael T. Wallace; Kevin T. Cuenot (57) ABSTRACT

A method and apparatus are provided that allow exploitation of the common mode characteristics of a differential transmission network to provide an additional data signal. Signal represents either a binary signal or a multi-valued signal to allow signaling of one or more bits of information. The signaling occurs through the variation of the common mode voltage in transmitters and is detected using differential receiver. One embodiment is presented that achieves signaling of an extended run length data sequence to allow continued transmitter/receiver synchronization throughout the transmission of the sequence. In an alternate embodiment, a separate data path is provided to signal the extended run length sequence when a common mode signaling path is not available.

20 Claims, 7 Drawing Sheets

OTHER PUBLICATIONS

Dai, Liang et al., "Comparison and Analysis of Phase Noise in Ring Oscillators," *Proceedings of the 2000 IEEE International Symposium on Circuits and Systems (ISCAS'2000)*, May 28-31, 2000, pp. V-77 to V-80, Geneva, Switzerland.

Demir, Alper et al., "Modeling and Simulation of Noise in Analog/Mixed-Signal Communication Systems," *Proceedings of the 1999 Custom Integrated Circuits Conference*, May 16-19, 1999, pp. 385-392, San Diego, California, USA.

Farjad-Rad, Ramin et al., "A 0.4-μm CMOS 10-Gb/s 4-PAM Pre-Emphasis Serial Link Transmitter," *1998 Symposium on VLSI Circuits Digest of Technical Papers*, Jun. 11-13, pp. 198-199, Honolulu, Hawaii, USA.

Farjad-Rad, Ramin et al., "A 0.4-μm CMOS 10-Gb/s 4-PAM Pre-Emphasis Serial Link Transmitter," *IEEE Journal of Solid-State Circuits*, May 1999, vol. 34, No. 5, pp. 580-585.

Farjad-Rad, Ramin et al., "A 0.3-μm CMOS 8-Gb/s 4-PAM Serial Link Transceiver," *IEEE Journal of Solid-State Circuits*, May 2000, vol. 35, No. 5, pp. 757-764.

Fiedler, Alan et al., "A 1.0625Gbps Transceiver with 2x-Oversampling and Transmit Signal Pre-Emphasis," *Proceedings of the 1997 IEEE International Solid-State Circuits Conference (ISSCC'97)*, Feb. 6-8, 1997, Paper FP 15.1, pp. 238-239 and 464, San Francisco, California, USA.

Fukaishi, M. et al., "A 4.25Gb/s CMOS Fiber Channel Transceiver with Asynchronous Binary Tree-type Demultiplexer and Frequency Conversion Architecture," *Proceedings of the 1998 IEEE International Solid-State Circuits Conference (ISSCC'97)*, Feb. 5-7, 1998, Paper SA 19.3, pp. 306-307 and 452, San Francisco, California, USA.

Hajimiri, Ali et al., "Jitter and Phase Noise in Ring Oscillators," *IEEE Journal of Solid-State Circuits*, Jun. 1999, pp. 790-804, vol. 34, No. 6.

Hajimiri, Ali et al., "Design Issues in CMOS Differential LC Oscillators," *IEEE Journal of Solid-State Circuits*, May 1999, pp. 717-724, vol. 34, No. 5.

Hajimiri, Ali et al., "Phase Noise in CMOS Differential LC Oscillators," *1998 Symposium on VLSI Circuits Digest of Technical Papers*, Jun. 11-13, 32 pp., Honolulu, Hawaii, USA.

Heydari, Payam et al., "Analysis of Jitter due to Power-Supply Noise in Phase-Locked Loops," *Proceedings of the 2000 IEEE Custom Integrated Circuits Conference (CICC)*, May 21-24, 2000, pp. 443-446, Orlando, Florida, USA.

Iravani, Kamran et al., "Clock and Data Recovery for 1.25Gb/s Ethernet Transceiver in 0.35μm CMOS," *1998 IEEE Custom Integrated Circuits Conference (CICC)*, May 11-14, 1998, pp. 261-264, Santa Clara, California, USA.

Iravani, Kamran et al., "VCOs with Very Low Sensitivity to Noise on the Power Supply," *1998 IEEE Custom Integrated Circuits Conference (CICC)*, May 11-14, 1998, pp. 515-518, Santa Clara, California, USA.

Johns, David A. et al., "Integrated Circuits for Data Transmission Over Twisted-Pair Channels," *IEEE Journal of Solid-State Circuits*, Mar. 1997, pp. 398-406, vol. 32, No. 3.

Kim, Min-Ho et al., "A VCO Jitter Performance Comparison of Frequency Synthesizer with Analog-HDL and SPICE Modeling," *Proceedings of the 1999 IEEE Region 10 Conference (TENCON99)*, Dec. 1999, pp. 1034-1037, vol. 2, Cheju Island, South Korea.

Lau, B. et al., "A 2.6GB/s Multi-Purpose Chip-to-Chip Interface," *Proceedings of the 1998 IEEE International Solid-State Circuits Conference (ISSCC'98)*, Feb. 5-7, 1998, Paper FA 10.4, pp. 162-163 and 431, Santa Clara, California, USA.

Lee, Joonsuk et al., "A 250MHz Low Jitter Adaptive Bandwidth PLL," *Proceedings of the 1999 IEEE International Solid-State Circuits Conference (ISSCC'99)*, Feb. 15-17, 1999, San Francisco, California, USA.

Lee, Thomas H., "Oscillator Phase Noise: A Tutorial (Invited)," *Proceedings of the IEEE 1999 Custom Integrated Circuits Conference*, May 16-19, 1999, pp. 379-380, San Diego, California, USA.

Sun, Lizhon et al., "A 1.25GHz 0.35μm Monolithic CMOS PLL Clock Generator for Data Communications," *Proceedings of the IEEE 1998 Custom Integrated Circuits Conference*, May 11-14, 1998, pp. 265-268, Santa Clara, California, USA.

Takahashi, Masayuki et al., "VCO Jitter Simulation and Its Comparison with Measurement," *Proceedings of the 1999 Asia and South Pacific Design Automation Conference (ASP-DAC'99)*, Jan. 18-21, 1999, pp. 85-88, vol. 1, Wanchai, Hong Kong.

Tamura, Hirotaka et al., "PRD-Based Global-Mean-Time Signaling for High Speed Chip-to-Chip Communications," *Proceedings of the 1998 IEEE International Solid-State Circuits Conference (ISSCC'98)*, Feb. 5-7, 1998, Paper FA 10.5, pp. 164-165, Santa Clara, California, USA.

Walker, Richard C. et al., "A 10Gb/s Si-Bipolar TX/RX Chipset for Computer Data Transmission," *Proceedings of the 1998 IEEE International Solid-State Circuits Conference (ISSCC'98)*, Feb. 5-7, 1998, Paper SA 19.1, pp. 302-303 and 450, Santa Clara, California, USA.

Wang, Hongmo, "Comments on 'Design Issues in CMOS Differential LC Oscillators'," *IEEE Transactions on Solid-State Circuits*, Feb. 2000, pp. 286-287, vol. 35, No. 2.

\* cited by examiner

METHOD AND APPARATUS FOR SIGNALING CHARACTERISTICS OF A TRANSMITTED SIGNAL

FIELD OF THE INVENTION

The present invention generally relates to communication systems, and more particularly, to a communication system that utilizes the common mode component of a differential signal or another data signal to communicate information pertaining to the first data signal.

BACKGROUND OF THE INVENTION

Modern society depends upon electronic communication for many of its functions, where electronic communication may generally be divided between analog communications and digital, or discrete, communications. Digital communication presently is the predominant form of communication.

Digital communication is simply the process of exchanging information using finite sets of symbols that are represented by different types of signals. In modern practice, these signals may be electrical waveforms, for example, propagated from point to point along a controlled impedance transmission path of a printed circuit board (PCB). In other forms of modern practice, for example, digital communication utilizes a free space medium, using electromagnetic fields to propagate the information from one point to another. Still other transmission media includes an optical data path as utilized, for example, by the Synchronous Optical NETwork (SONET).

In any case, a serial communication channel is established to convey serial data from a transmitter to a receiver, whereby data timing integrity is maintained by synchronizing the relative timing between the transmitter and the receiver. That is to say, that the clock signal used by the transmitter should either be transmitted to the receiver in a separate channel, i.e., clock forwarding, or combined with the transmitted data and then sent to the receiver as a composite signal. Synchronization is achieved, therefore, when the receiver recovers the transmitted clock signal, thus establishing synchronism with the transmitter and then utilizing the recovered clock signal to latch the received data.

The use of a composite clock and data signal is generally preferred over clock forwarding for several reasons. First, the composite signal is insensitive to relative timing skews between the respective clock and data signals. Since the composite signal is subject to the same multi-path, fade, delay, reflection, and other signal degradation phenomenon, the relative effect on the data and clock signals is virtually non-existent. Second, the composite signal only requires a single channel for transmission, whereas clock forwarding requires two channels: one for the data signal; and one for the clock signal. The composite signal is then subjected to a Clock and Data Recovery (CDR) circuit at the receiving end in order to extract the respective clock and data components of the composite signal.

Basic approaches to accomplish the CDR function include, for example, a Surface Acoustic Wave (SAW) based CDR and a Phase-Lock Loop (PLL) based CDR. The SAW based CDR utilizes a high Q band-pass filter having an extremely narrow pass-band. Due to the inherent narrow band operation of the SAW filter, spectral energy relating to the clock frequency is readily available at the output of the SAW filter. After compensation of the SAW filter delay is performed, the resultant clock signal may be used to latch the received data. One advantage of using a SAW based CDR, is that very little phase jitter is introduced by the CDR, due to the passive and high Q nature of the SAW filter.

PLL based CDR is another popular method of extracting the clock and data signals from the composite signal. A phase-locked loop is utilized to phase lock to the received composite signal and to generate a clock signal that is substantially synchronized to the transmitted clock signal. Once the clock signal is generated, it can then be used to extract the data signal from the composite signal.

One drawback of both the SAW based and PLL based CDRs, however, stems from their dependency on data transitions within the composite signal. For example, if no spectral energy relating to the clock portion of the composite signal exists, then the output of the SAW filter is simply narrow band noise. Likewise, lack of signal transitions within the composite signal usually causes the phase detection component of the PLL based CDR to fail or incorrectly report phase error, thus causing the PLL to eventually drift in frequency and lose synchronization with the transmitting device.

Lack of data transitions within the composite signal may be attributed to long run lengths within the data sequence or simply a cessation of data transmission. Framed data sequences may be coded in such a way as to mitigate long run lengths such that at least a minimum transition frequency within the composite signal may be ensured. 8b/10b codes exemplify such a coding, in which 8 bits of data are encoded into a 10 bit data word, such that run lengths of no more than 5 bits and minimum transition densities are guaranteed. The 8b/10b coding scheme, however, has disadvantages of consuming the additional channel bandwidth used by the extra 2 bits and requiring encoding hardware at the transmitter and decoding hardware at the receiver. As an alternative, bit scrambling may be used to lower the Direct Current (DC) content of the transmitted signal and to increase the number of zero crossings with low transition density data so as to facilitate clock recovery. Bit scrambling, however, does not totally preclude the possibility of a long stream of data being represented as a very long string of transition-less data, thus creating potential problems in both the SAW filter and PLL based CDRs.

An apparatus and method that addresses the aforementioned problems, as well as other related problems, are therefore desirable.

SUMMARY OF THE INVENTION

The various embodiments of the invention provide a communication system employing differential and common mode signaling, or in the alternate, two separate signaling paths. A transmission system produces a composite signal. The composite signal includes a data signal having first and second interpretations, and a common mode signal, or a signal on the second signaling path. A receiver system is arranged to receive the composite signal. A first value of the common mode signal indicates a first interpretation of the data signal and a second value of the common mode signal indicates a second interpretation of the data signal.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the present invention are described in terms of the signaling of long run length data sequences. Embodiments of receive and transmit circuitry is shown using Metal Oxide Semiconductor (MOS) topologies. Those skilled in the art will appreciate that the invention could be implemented in other circuit topologies such as P-type MOS Field Effect Transistor (PMOSFET), N-type (NMOS-FET) topologies, Complementary MOS (CMOS) topologies, bipolar-Complementary MOS (biCMOS), Silicon-Germanium (SiGe), or Silicon-On-Insulator (SOI) topologies.

Figure 1:
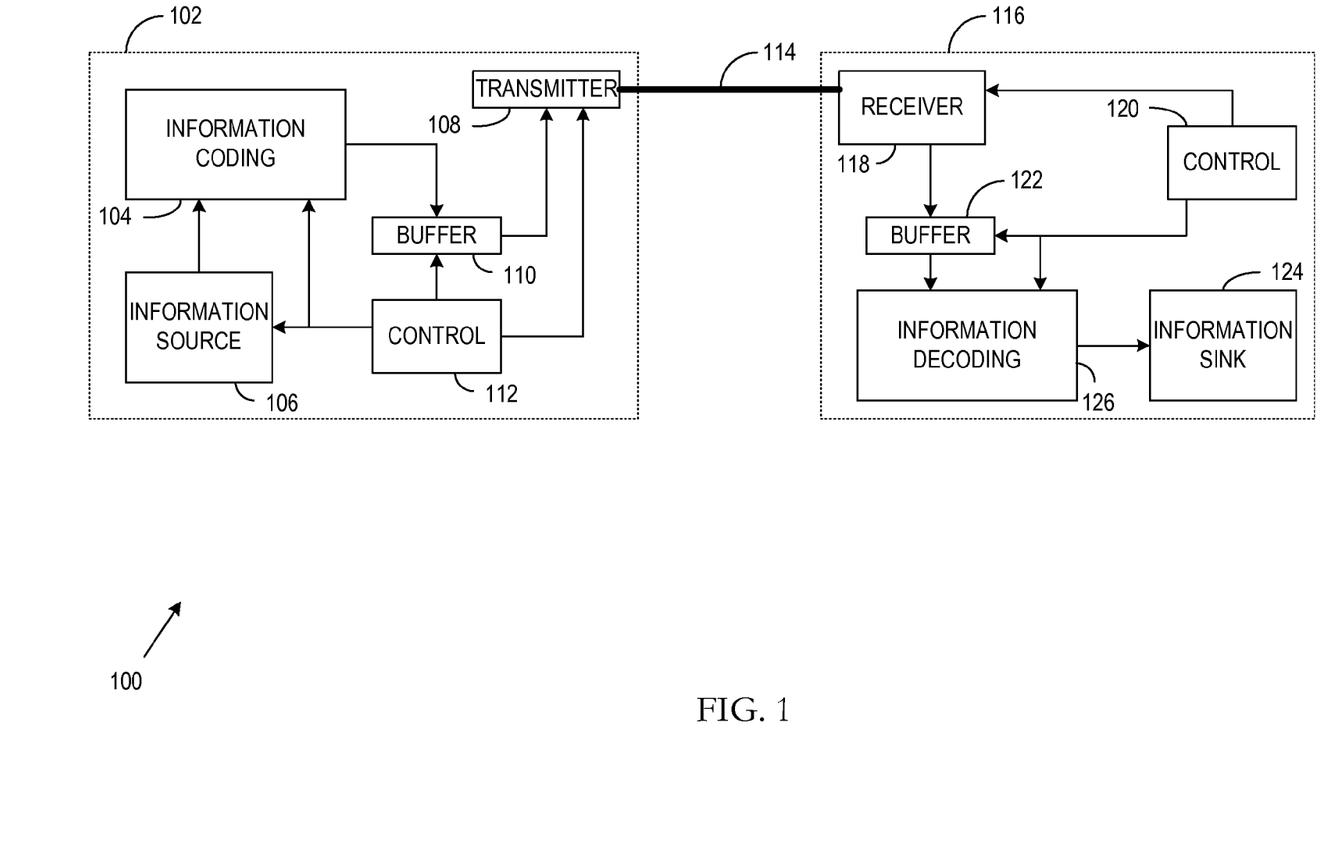
FIG. 1 illustrates an exemplary communication system in accordance with the principles of the present invention.

FIG. 1 illustrates communication system 100 in which the principles of an embodiment of the present invention may be employed. Communication system 100 is comprised of transmission system 102, channel 114, and receiving system 116. Communication system 100 may be employed to facilitate: chip to chip communications; communications between different Printed Circuit Board (PCB) assemblies within a subsystem; subsystem to subsystem communications within a fully integrated, local system; or communications between remote systems. Channel 114 may include any media type including: signal traces on a glass epoxy PCB; or copper transmission media, such as twisted pair, or controlled impedance coaxial cable.

Transmission system 102 includes a source of information 106 that is generally considered to provide binary information, such as that used in digital communication systems, but may also include analog information. Information coding 104 may include any number of binary encoding systems such as source encoders, encryptors, and channel encoders, or simply provide outputs suitable for analog modulation function, such as Amplitude Modulation (AM), Frequency Modulation (FM), or simple voltage or current coding using Return to Zero (RZ) or Non-Return to Zero (NRZ) formats. In the case of a digital communication system, buffer 110 may provide buffering operation, such that coded data may be stored while waiting to be transmitted by transmitter 108. Alternately, buffer 110 may simply be an analog amplifier intended to boost the Signal to Noise Ratio (SNR) of the modulated signal prior to transmission by transmitter 108. Control 112 may be implemented by an appropriate micro-processor, micro-controller, or custom control logic block as required to achieve the desired characteristics of transmission system 102.

Receiving system 116 is adapted to receive analog or digital signals as delivered by channel 114. Receiver 118 may represent a digital receiver, employing a CDR system to recover the respective clock and data signals of the received NRZ or RZ signal, or may simply represent, for example, an AM or FM demodulator for use in an analog communication system. Buffer 122 may represent, for example, a FIFO used for digital communications or in the case of an analog communication system, buffer 122 may represent an amplifier used to increase the noise margin of receiving system 116. Information decoding block 126 implements the inverse of information coding block 104, whether it be, for example, AM/FM demodulation or channel decoding. Information sink 124 is configured to receive the data transmitted by information source 106. Control 120 may be implemented by any micro-processor, micro-controller, or custom control logic as required to achieve the desired characteristics of receiving system 116.

In operation, communication system 100 is arranged to facilitate a signaling path, which utilizes the physical characteristics of transmitter 108 and channel 114 as the signaling conduit. In one embodiment, for example, a differential transmission path is provided, whereby a differential amplifier in transmitter 108 is arranged to provide complementary output signals to channel 114. Likewise, a differential amplifier in receiver 118 is provided, whereby the complementary signals are received. In this case, each of the complementary signals represents a binary information signal, where the complementary signals have logic values that are mutually exclusive of one another.

An additional data signal is derived by receiver 118, in accordance with an embodiment of the present invention, such that the average of the magnitudes of the two complementary signals is taken. The average is then compared to a predetermined threshold within receiving system 116 to determine the logic value of the additional data signal. In one embodiment, if the average value of the magnitudes of the two complementary signals are below the predetermined threshold, then the logic value of the additional data signal is at a logic 0. If, on the other hand, the average value of the magnitudes of the two complementary signals are above the predetermined threshold, then the logic value of the additional data signal is at a logic 1.

The logic value of the additional data signal derived may be used to signal any number of events. One such event, for example, may include the signaling of an excessive run length of a continuous stream of logic 1 or logic 0 data, such that the complementary signals of the differential transmission path do not change polarity. In such a case, control 112 may monitor buffer 110 in a digital communication scheme, in search of an excessive run length of digital data. Once found, control 112 may signal the condition to transmitter 108, and in response, transmitter 108 makes the necessary adjustments to the physical characteristics of the complementary data signals to signal the condition to receiver system 116. The signal is then detected by receiver system 116 and the appropriate action taken.

Once an excessive run length of logic values has been signaled, transmission system 102 and receiving system 116 may transition to a second mode of operation, where synchronization data, as opposed to operational data, from transmission system 102 is transmitted to receiving system 116. Both modes of operation, therefore, supply receiving system 116 with adequate zero crossings and transition density to support a CDR mode of reception by receiver 118.

Figure 2:
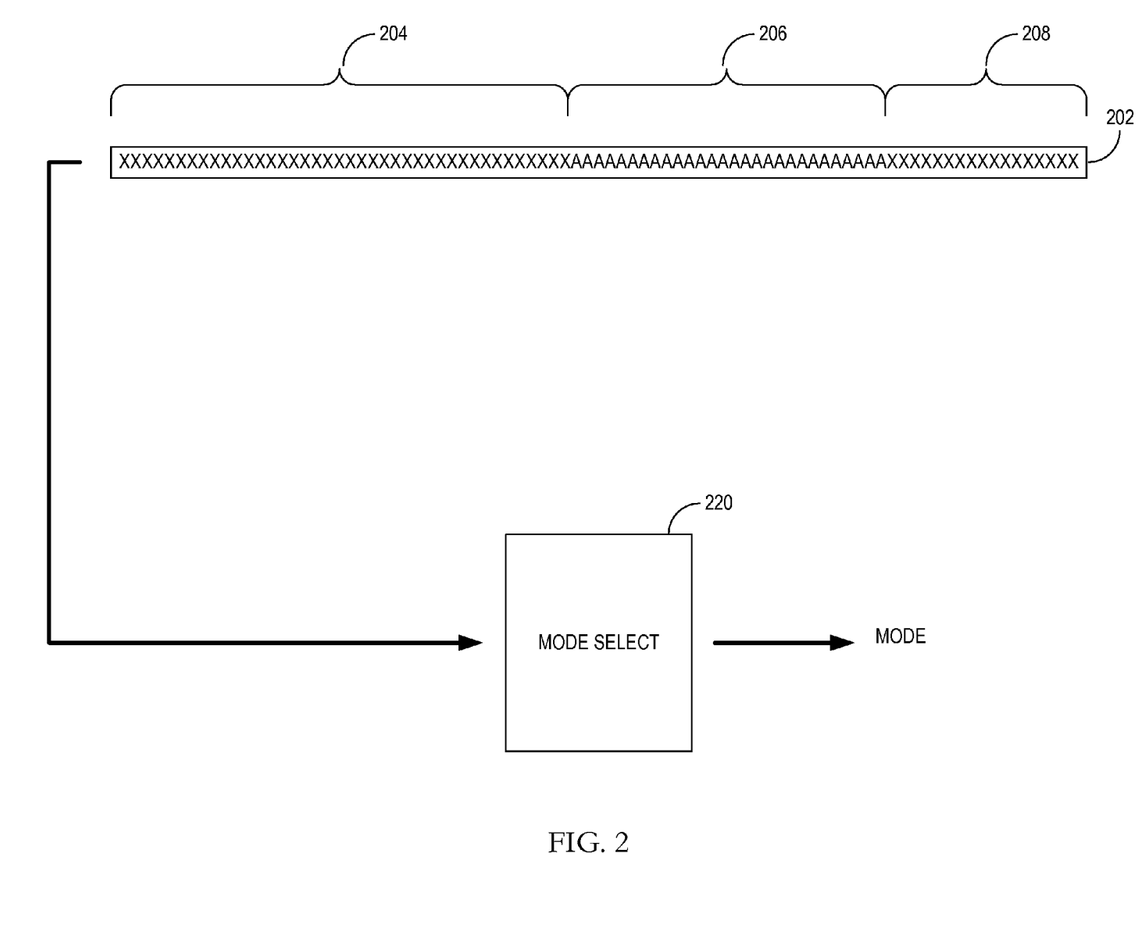
FIG. 2 illustrates an exemplary functional diagram in accordance with the principles of an embodiment of the present invention.

FIG. 2 illustrates an exemplary functional diagram in accordance with an embodiment of the present invention. Transmit queue 202 represents, for example, a portion of buffer 110 of FIG. 1, which is operating in digital mode. Data strings 204 and 208 represents data having normal zero crossings and adequate transition density to support CDR operation within receiver 118 of FIG. 1. Data string 206, however, represents an excessive run length of either logic 1 values or logic 0 values, such that proper CDR operation is not supported within receiver 118. According to the principles of an embodiment of the present invention, mode select 220 monitors data strings 204-208 and programs the value of signal MODE, such that CDR reception may operate correctly while transmitting all data strings 204-208.

In operation, mode select 220 may be implemented within control 112 of FIG. 1. Data strings 204-208, respectively, are transmitted by transmitter 108 in consecutive order to receiver 118. Data string 204 represents the first data string to be transmitted, whereby signal MODE is set by control 112 to indicate a normal transition density in support of CDR reception at receiver 118.

Control 112 "looks ahead" to data string 206 and causes signal MODE to change logic value while the transmission of data string 206 is taking place. Transmitter 108, in response to the mode change, causes the physical characteristics of its output signal to change, such that receiver 118 may respond accordingly. In one embodiment, transmitter 108 may adjust the common mode voltage of its differential output signal to effect the change in the physical characteristics of the output signal. In another embodiment, a separate signaling channel may be used to signal the change in the physical characteristics of the output signal. Detecting the common mode voltage change, receiver 118 changes its mode of operation to correlate to the mode change.

Since data string 206 represents a data string having inadequate transition density to support CDR reception, control 112 signals information source 106 to provide a predetermined data string to be transmitted in place of data string 206. The predetermined data string supplied by information source 106 not only provides the required transmission density for adequate CDR reception, but also may be a sequence recognized by receiver 118 indicating the logic value of data string 206. For example, if data string 206 is a run length of all logic 1 values, then the predetermined data string provided by information source 106 may be a maximal length, Pseudo Noise (PN) sequence defined by a first R4 polynomial having a maximum run length of 3. If, on the other hand, data string 206 is a run length of all logic 0 values, then the predetermined data string provided by information source 106 may be a maximal length, PN sequence defined by a second R4 polynomial also having a maximum run length of 3. The PN sequences, each having a repetition period of $p=2^n-1=15$ bits, would be repeated until data string 206 expires. Alternately, the receiver may simply assign the data value read previously to receiving the MODE signal to data that has been replaced by the predetermined data string.

Prior to expiration of data string 206, however, control 112 "looks ahead" to anticipate the transmission of data string 208. The logic value of signal MODE is changed back to its original value during transmission of data string 208. It should be noted that transmit queue 202 should have sufficient length to accommodate the delays required to: change the common mode voltage; sense the change at the receiving end; change the common voltage back to the original state; and sense the change at the receiving end during the time that the data passes through transmission queue 202.

By substituting an R4 PN code in place of the long run length data string 206, adequate transition density is provided to receiver 118, such that proper CDR reception is achieved throughout transmission of data strings 204-208. Receiving system 116 buffers data received during transmission of data strings 204 and 208 into buffer 122, and may discard or replace data received during transmission of data string 206, since data received during this period is primarily used for synchronization purposes. It can be seen, therefore, that an embodiment of the present invention allows the transmission of long run length codes, even infinite run length codes, while maintaining synchronism between transmission system 102 and receiving system 116.

Although some embodiments of the present invention have applicability to using signal characteristic changes to signal long run length codes, other features of communication system 100 may be signaled. For example, the signaling may be used to indicate that a different coding or scrambling scheme is about to be performed by information coding block 104. Dynamic coding changes, for example, may provide a higher transition density depending upon the data type generated by information source 106 and may provide superior performance based upon channel 114 conditions.

It should be noted also that receiving system 116 does not have to ignore data transmitted during the synchronization only time periods, e.g., during transmission of data string 206. The synchronization data may, for example, provide other control information, such as channel bonding information, that may be relevant to receiving system 116.

Figure 3:
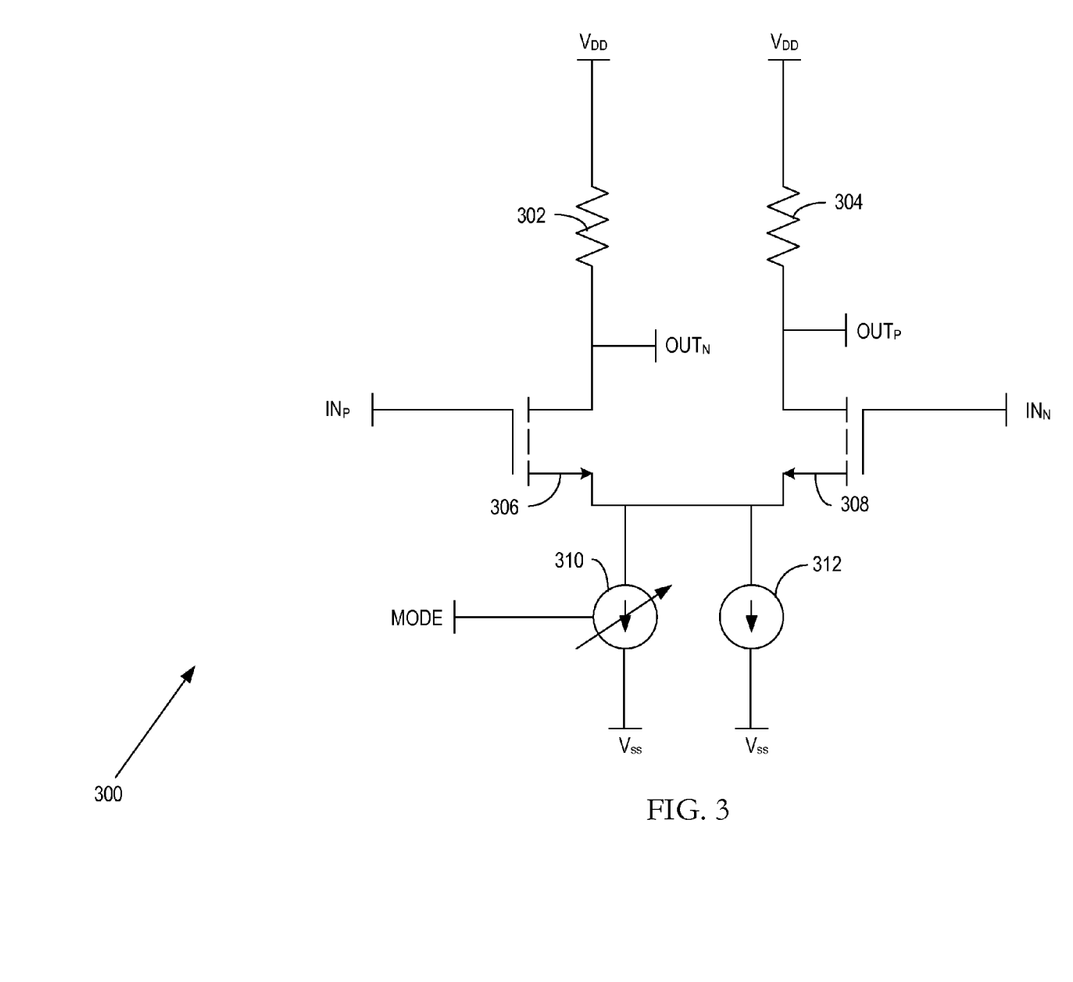
FIG. 3 illustrates an exemplary schematic of a differential amplifier according to an embodiment of the present invention.

FIG. 3 illustrates an exemplary schematic diagram of differential amplifier 300 in accordance with an embodiment of the present invention. Differential amplifier 300 not only provides complementary data outputs $OUT_P$ and $OUT_N$, but a third data signal, $V_{CM}$, is provided by the common mode voltage defined by equation (1):

$$V_{CM} = \frac{V_{OUTP} + V_{OUTN}}{2} \quad (1)$$

where $V_{CM}$ is the common mode voltage, $V_{OUTP}$ is the voltage level at node $OUT_P$ and $V_{OUTN}$ is the voltage level at node $OUT_N$. $V_{CM}$ may take on may different values and may be interpreted in many different ways, but differential amplifier 300 illustrates one embodiment where signaling is performed using only two values of $V_{CM}$.

Transistors 306 and 308 are coupled in a common source configuration, whereby a first conductor of current sources 310 and 312 are coupled to the common source node and a second conductor of current sources 310 and 312 are coupled to a reference potential, e.g., $V_{SS}$. Resistors 302 and 304 are coupled to the drain terminals of transistors 306 and 308 at output nodes $OUT_N$ and $OUT_P$, respectively. Resistors 302 and 304 are coupled to supply potential $V_{DD}$. A first input, $IN_P$, is coupled to the gate terminal of transistor 306 and a second input, $IN_N$, is coupled to the gate terminal of transistor 308. Signal MODE is coupled to the control terminal of current source 310.

Differential amplifier 300 is representative of a typical output circuit operating within, for example, transmitter 108 of FIG. 1. In operation, differential amplifier 300 receives input signals $IN_P$ and $IN_N$ that are operating complementary to one another. In other words, when $IN_P$ is at a logic high level, $IN_N$ is at a logic low level, thus rendering transistor 306 to be in a conductive state and transistor 308 to be in a non-conductive state. Conversely, when $IN_P$ is at a logic low level, $IN_N$ is at a logic high level and transistor 306 is in a non-conductive state and transistor 308 is in a conductive state.

The voltage level at nodes $OUT_P$ and $OUT_N$ provides the differential output signal used to signal, for example, the data provided by buffer 110 of FIG. 1. For example, if a logic 1 is to be transmitted to, for example, receiver 118 of FIG. 1, then $IN_P$ is at a logic 1 value and $IN_N$ is at a logic 0 value. Transistor 308 is in a non-conductive state, whereby the voltage at node $OUT_P$ is substantially equal to $V_{DD}$. Transistor 306, on the other hand, is in a conductive state, whereby the voltage at node $OUT_N$ is substantially equal to $V_{DD}-(R_{302}*I_{306})$, where $R_{302}$ is the resistance value of resistor 302 and $I_{306}$ is the current conducted by transistor 306. The differential signal received by receiver 116, therefore, is substantially equal to:

$$V_D = V_{OUTP} - V_{OUTN} = V_{DD} - (V_{DD} - (R_{302}*I_{306}))$$
$$= R_{302}*I_{306} \quad (2)$$

Similarly, if a logic 0 is to be transmitted to, for example, receiver 118 of FIG. 1, then $IN_P$ is at a logic 0 value and $IN_N$ is at a logic 1 value. Transistor 306 is in a non-conductive state, whereby the voltage at node $OUT_N$ is substantially equal to $V_{DD}$. Transistor 308, on the other hand, is in a conductive state, whereby the voltage at node $OUT_P$ is substantially equal to $V_{DD}-(R_{304}*I_{308})$, where $R_{304}$ is the resistance value of resistor 304 and $I_{308}$ is the current conducted by transistor 308. The differential signal received by receiver 116, therefore, is substantially equal to:

$$V_D = V_{OUTP} - V_{OUTN} = (V_{DD} - (R_{304}*I_{308})) - V_{DD} = -(R_{304}*I_{308}) \quad (3)$$

The common mode voltage associated with the differential signal may be expressed as:

$$V_{CM} = \frac{V_{OUTP} + V_{OUTN}}{2} = \frac{2*V_{DD} - R*I}{2} \quad (4)$$

where R represents either resistor 302 or 304, and I is either the current conducted by transistor 306 or 308, respectively. Equation (4) assumes that the current conducted by transistors 306 and 308 in their respective conductive states is equivalent and that the resistance values of resistors 302 and 304 are also equivalent.

Current sources 310 and 312 comprise the tail current for differential amplifier 300. In the exemplary embodiment of FIG. 3, current source 312 is always conductive and current source 310 is only conductive when signal MODE is appropriately set. For example, if signal MODE is at a logic high, then current source 310 is operative, whereas if signal MODE is at a logic low, then current source 310 is non-operative. The amount of current conducted by either transistor 306 or 308 in their respective conductive states is the sum of the currents provided by current sources 310 and 312, i.e., $I_{310}$ and $I_{312}$, respectively. It follows that when signal MODE is at a logic 0, for example, then I in equation (4) is just equal to the current conducted by current source 312. Conversely, when signal MODE is at a logic 1, then I in equation (4) is equal to:

$$I = I_{310} + I_{312} \quad (5)$$

It can be seen from equations (4) and (5), that the magnitude of the common mode voltage, $V_{CM}$, may be varied between two values through selection of the logic value of signal MODE. The potential difference between $V_{DD}$ and $V_{CM}$ is directly proportional to the value of the tail current programmed by signal MODE and may be detected through appropriate circuitry in, for example, receiver 118 of FIG. 1. It should be noted that although current source 312 is illustrated as a fixed current source, current source 312 may also be implemented as a variable current source to provide additional flexibility to the control of the tail current of differential amplifier 300.

In an exemplary embodiment, a first value of $V_{CM}$ may designate that data is being transmitted by 108 of FIG. 1 having adequate transition density to support CDR reception in receiver 118. A second value of $V_{CM}$, for example, may designate that substitute data is being transmitted to receiver 118 for synchronization purposes.

Figure 4:
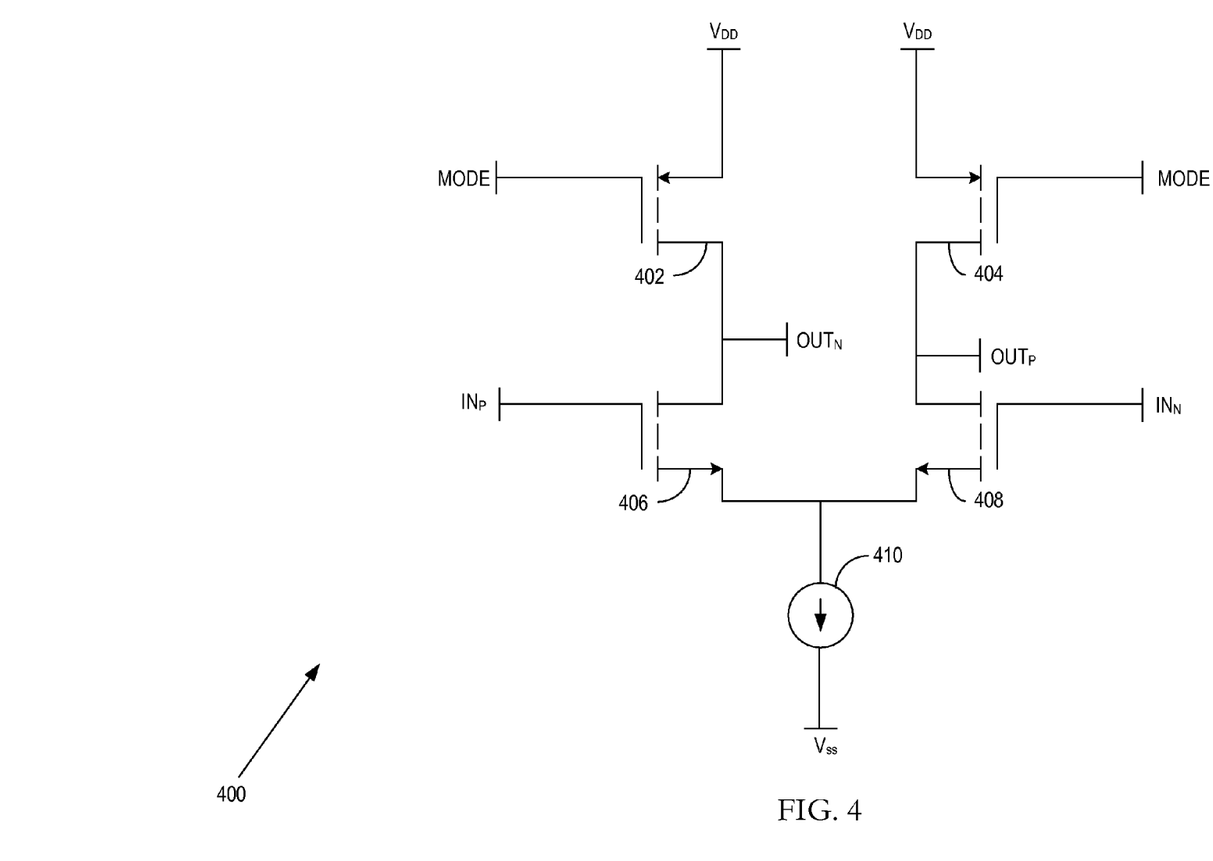
FIG. 4 illustrates another embodiment of a differential amplifier according to an embodiment of the present invention.

In an alternative embodiment, differential amplifier 400 of FIG. 4 allows a greater variation in the value of $V_{CM}$ to be provided. Current source 410 provides a fixed amount of tail current to be conducted by either transistor 406 or 408 in their respective conductive states. A complementary relationship exists between inputs $IN$ and $IN_N$ and outputs $OUT_P$ and $OUT_N$ as discussed above.

PMOS transistor 402 and PMOS transistor 404 are operating in their ohmic or triode region for all values of MODE, which allows transistors 402 and 404 to be used as non-linear, voltage controlled resistors. The resistance of PMOS transistors 402 and 404 monotonically increases with the value of signal MODE, such that the resistance increases with increasing values of signal MODE and the resistance decreases with decreasing values of signal MODE. The common mode voltage may be expressed as:

$$V_{CM} = \frac{V_{OUTP} + V_{OUTN}}{2} = \frac{(V_{DD} + V_{DS404}) + (V_{DD} + V_{DS402})}{2} \quad (6)$$

where $V_{DS404}$ is the drain to source voltage of transistor 404, and $V_{DS402}$ is the drain to source voltage of transistor 402. Note that $V_{DS404}$ and $V_{DS402}$ are negative values for the normal operating ranges of this circuit.

It can be seen from equation (6) that a wide variation on the value of $V_{CM}$ is possible, since the value of transistor resistance may take on many different values in response to the various values of signal MODE that may be applied to the gate terminals of transistors 402 and 404. In one embodiment, therefore, more than a single bit of information may be signaled through variations in $V_{CM}$. For example, four distinct values of $V_{CM}$ may be signaled from transmitter 108 of FIG. 1 to receiver 118. The first set of two values of $V_{CM}$, for example, may differentiate between the transmission of normal data and synchronization data, whereas the second two values of $V_{CM}$, for example, may differentiate between first and second source coding algorithms performed by information coding 104.

An alternate embodiment may include the combined features of differential amplifiers 300 and 400 of FIGS. 3 and 4, respectively. In such an embodiment, a combination of programmable tail current and programmable, active load resistances, e.g., voltage controlled resistors, yields an implementation that allows common mode voltage variation while providing greater control over the characteristic impedance of the differential amplifier.

Figure 5:
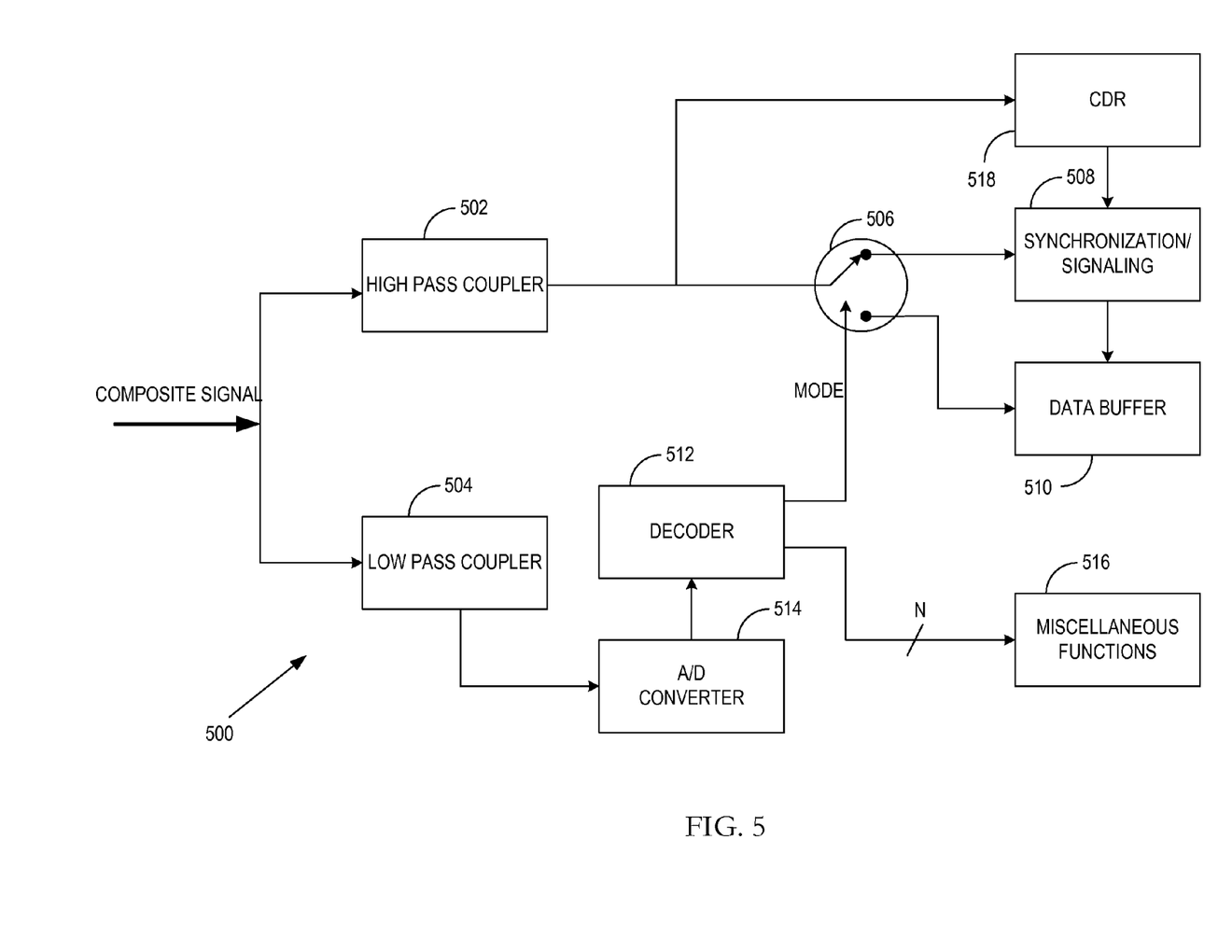
FIG. 5 illustrates an exemplary functional block diagram of a receiver according to an embodiment of the present invention.

FIG. 5 illustrates an exemplary functional block diagram of a receiver in accordance with an embodiment of the present invention. A composite signal is received by both high pass coupler 502 and low pass coupler 504, where switch 506 accepts the output of the high pass coupled composite signal at its pole. Low pass coupler 504 is coupled to Analog to Digital Converter (ADC) 514, which is then coupled to decoder 512. Decoder 512 is coupled to provide control to switch 506 and to miscellaneous functions 516 as required. Synchronization/signaling block 508 is coupled to a first output conductor of switch 506 and the second output conductor of switch 506 is coupled to data buffer 510. CDR 518 is coupled to receive the output of high pass coupler and coupled to synchronization/signaling block 508.

In operation, receiver 500 accepts a composite signal that is made up of a differential data signal and a common mode voltage signal. The differential data signal that is received is described by equations (2) and (3) and alternates in relation to the actual bit value being conveyed. The common mode voltage signal that is received is described by equations (4) and (6) and represents a signaling signal that is translated into the requisite control signals provided by decoder 512. Generally speaking, the common mode voltage signal indicates how the differential data signal is to be interpreted. In a first instance, the common mode voltage signal indicates that the differential data signal is to be interpreted as either a synchronization signal or a signal carrying additional signaling information, or both. In a second instance, the common mode voltage signal indicates that the differential data signal is to be interpreted as an operational data signal.

In one embodiment, the common mode voltage signal takes on binary values, whereby low pass coupler 504 converts the common mode voltage signal received from the composite signal into one of two voltage values. The voltage value is then converted to a digital control word by ADC 514 and is subsequently decoded by decoder 512 to provide control signals to switch 506 and miscellaneous functions 516. Signal MODE, for example, is provided by decoder 512, in response to the common voltage received by low pass coupler 504, and then used to control the switch position for switch 506. In a first mode of operation, the common mode voltage signal received may indicate that the differential data represents synchronization or signaling data, rather than operational data. In a second mode of operation, the common mode voltage signal received may indicate that the differential data represents operational data and not only synchronization or signaling data.

In particular, the switch position illustrated in FIG. 5 indicates that synchronization/signaling data is being received and that the common mode voltage causes decoder 512 to assert signal MODE. In such an instance, for example, the operational data may be experiencing a long run length of logic 1 or logic 0 values and, therefore, lacks the transitional density to support CDR reception. In both cases, synchronism is achieved through the use of CDR 518, but the data is treated differently in each case. Although the data being received, e.g., a maximal length PN sequence, is primarily being used to achieve synchronism between the transmitter and receiver, the data may also represent signaling information that may be pertinent to receiver 500.

For example, the signaling information may invoke a loopback function such that the differential data transmitted by transmitter, e.g. 108 of FIG. 1, may be looped back to the transmitter by receiver, e.g. 118 of FIG. 1, in order to run diagnostic testing on channel 114 of FIG. 1. The differential data received provides no informational content other than synchronization or signaling and, therefore, does not need to be forwarded to data buffer 510 for storage.

It should be noted, however, that synchronization/signaling block 508 places data into data buffer 510 that is representative of the logic state of the long run length data string. For example, if the PN sequence transmitted in place of the operational data string indicates a run length of logic 1 values, then logic 1 bits are placed into data buffer 510 accordingly. If, on the other hand, the PN sequence transmitted in place of the operational data string indicates a run length of logic 0 values, then logic 0 bits are placed into data buffer 510.

Conversely, once the operational data contained within the composite signal supports a transitional density capable of supporting CDR reception, the common mode voltage transmitted will change value, causing decoder 512 to de-assert signal MODE to allow switch 506 to direct informational data to data buffer 510 for storage. In this case, CDR 518 supplies the necessary synchronizing data to synchronization/signaling block 508.

In alternate embodiments, the common mode voltage transmitted may assume multiple values, for example, as facilitated by differential amplifier 400 of FIG. 4. In such an instance, decoder 512 decodes the digitally converted common mode voltage values to the N control signals for use by miscellaneous functions 516. The N control signals may indicate, for example, that a different coding or scrambling scheme is to be employed by the transmitter. Miscellaneous functions 516 would then make any operational changes necessary to accommodate the new coding or scrambling scheme employed by the transmitter.

In another embodiment, the composite signal of FIG. 5, may be split into two separate signals by the transmitter; a differential data signal and a low frequency control signal. The control signal would still be received by low pass coupler 504 and decoded in the same way to effect control of switch 506 and miscellaneous functions 516 in the event that an extended idle period or other characteristic changes are forthcoming. Such an arrangement, for example, is applicable to communication systems that do not have a common mode mechanism to signal such an event, e.g., optical or optical/electrical communication systems.

Figure 6:
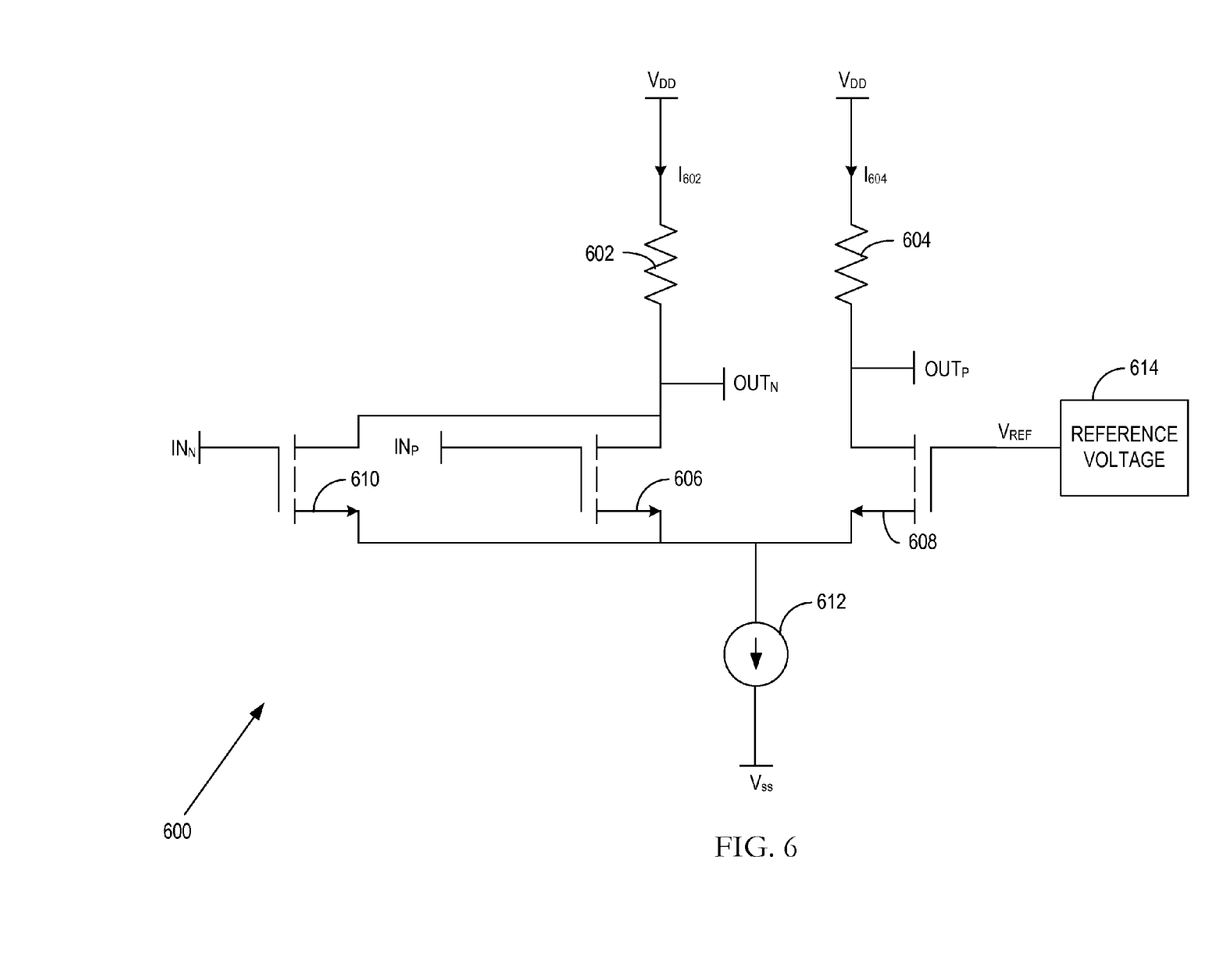
FIG. 6 illustrates an exemplary schematic diagram of the low pass coupler of FIG. 5.

FIG. 6 illustrates an exemplary schematic diagram of low pass coupler 504 of FIG. 5. Transistors 606 and 608 are configured in a common source arrangement, whereby current source 612 supplies the tail current for differential amplifier 600. Resistors 602 and 604 represent the load resistors generating output signals $V_{OUTN}$ and $V_{OUTP}$ at nodes $OUT_N$ and $OUT_P$, respectively, in relation to the conductive states of transistors 606, 610 and 608. Transistors 606 and 610 receive input signals $IN_P$ and $IN_N$ at their respective gate terminals, where signals $IN_P$ and $IN_N$ represent the complementary differential signals that comprise COMPOSITE SIGNAL of FIG. 5. Reference voltage block 614 supplies a reference voltage, $V_{REF}$, to the gate terminal of transistor 608 that may be supplied, for example, by a voltage source or a Digital to Analog Converter (DAC).

In operation, the left side of differential amplifier 600 provides transistors 606 and 610 whose collective conductive state is proportional to the amount of common mode voltage present at their respective gate terminals. It can be seen, therefore, that the voltage across nodes $OUT_P$ and $OUT_N$, $V_{OUT}$, can be written as:

$$V_{OUT}=(V_{DD}-(I_{604}*R_{604}))-(V_{DD}-(I_{602}*R_{602})) \approx K(V_{REF}-V_{CM}) \quad (7)$$

where $R_{602}$ and $R_{604}$ are the resistance values of resistors 602 and 604 and currents $I602$ and $I604$ represent the current conducted by resistors 602 and 604, respectively, and K is a multiplier. Thus, a difference relationship between the reference voltage $V_{REF}$ and the common mode voltage $V_{CM}$ is generated by differential amplifier 600 that can be used as an input to ND converter 514 of FIG. 5.

It should be noted that the channel width dimensions of transistors 606 and 610 are substantially equal to half of the channel dimension of transistor 608. Accordingly, the total current capacity of transistors 606 and 610 substantially equals the current capacity of transistor 608. In this way, the left side of differential amplifier 600 is balanced with the right side of differential amplifier 600 so that a true subtraction function may be implemented between the reference voltage and approximately the average value of $IN_P$ and $IN_N$.

Figure 7:
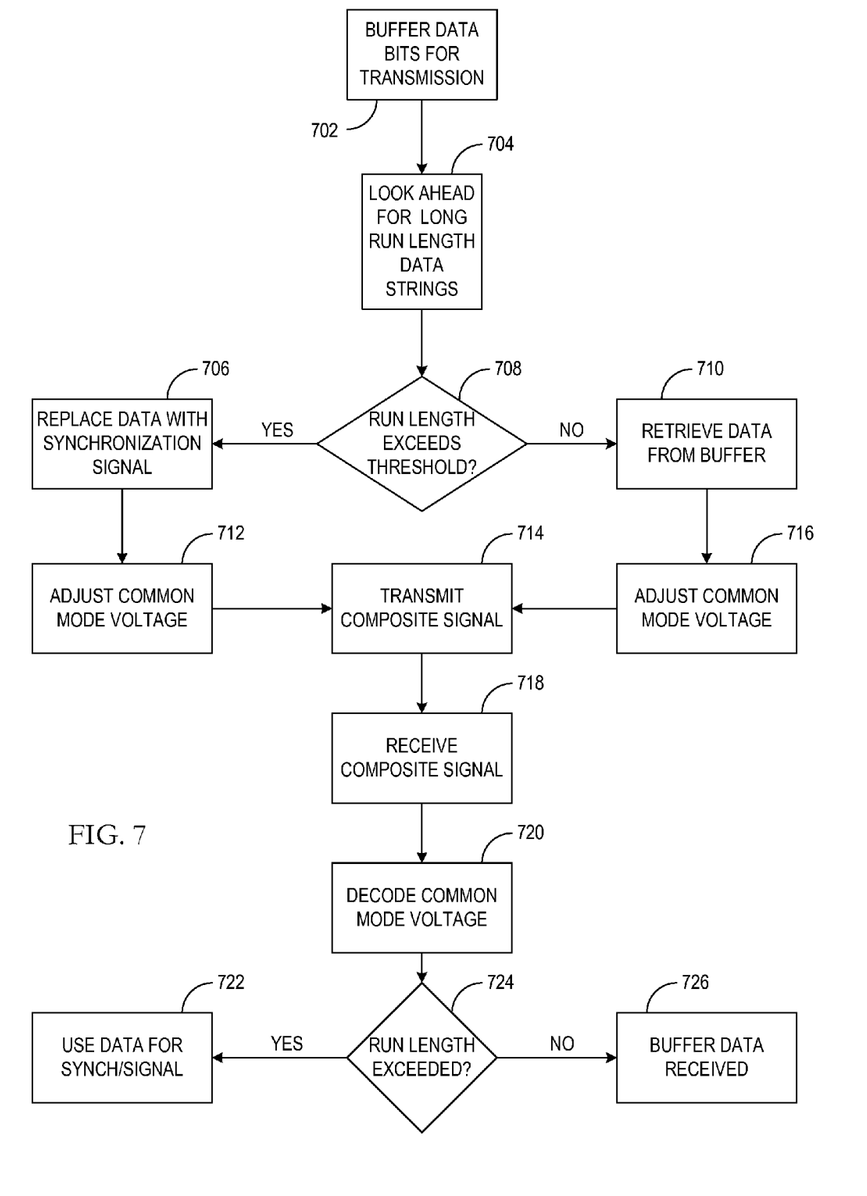
FIG. 7 illustrates an exemplary flow diagram of a method according to an embodiment of the present invention.

FIG. 7 illustrates an exemplary flow diagram of a method employed by an embodiment of the present invention and is explained in relation to communication system 100 of FIG. 1 and receiver 500 of FIG. 5. In step 702, transmission system 102 buffers data bits for subsequent transmission into buffer 110. Transmitter 108 employs a differential transmission scheme to transmit the data to receiver 118 via channel 114. As the transmission progresses, control 112 performs a look ahead function as in step 704, in order to identify data strings whose run length exceeds a predetermined threshold as in step 708.

In the event that the run length does exceed the predetermined threshold, some or all of the static data contained within buffer 110 is replaced by a synchronization/signaling signal contained within information source 106 as in step 706. The common mode voltage signal is adjusted by transmitter 108 to reflect the excessive run length, as in step 712, and the composite signal containing both the common mode voltage and the differential synchronization signal is transmitted to receiver 118 as in step 714.

In the event that the run length does not exceed the predetermined threshold, the operational data contained within buffer 110 is retrieved as in step 710. The common mode voltage signal is adjusted by transmitter 108 to reflect the normal condition, as in step 716, and the composite signal containing both the common mode voltage and the differential operational data is transmitted to receiver 118 as in step 714.

Once the signal is received by receiver 118 as in step 718, the common mode voltage is derived from the composite signal and decoded by decoder 512 as in step 720. If the decoded common mode voltage indicates an excessive run length of data, then control 120 uses the received differential signal for synchronization/signaling as in step 722, thus potentially bypassing CDR 518 for data detection. If, on the other hand, the decoded common mode voltage indicates normal data run lengths, then the received data is stored into buffer 122 for later retrieval by information sink 124 as in step 726, where CDR 518 supplies the requisite synchronizing information required by synchronization/signaling block 508.

Some embodiments of the present invention are believed to be applicable to a variety of transmission systems, in particular those transmission systems utilizing differential transmission schemes having the ability to signal a common mode voltage change. Other transmission systems that do not support common mode signaling, however, may also implement other embodiments of the present invention by providing a separate, low frequency signaling channel. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A differential amplifier pair arranged to signal characteristics of a transmitted signal, comprising:
    a transmit amplifier coupled to receive a mode signal and coupled to adjust a common mode signal in response to the mode signal;
    wherein the mode signal is a control signal that is different from the common mode signal and is indicative of a determined characteristic of a data signal; and
    a receiving system comprising a receive amplifier coupled to receive the common mode signal and the data signal from the transmit amplifier, wherein the receive amplifier performs a separation of the common mode signal from the data signal to derive the mode signal;
    wherein the receiving system is configured to select one of a plurality of different modes of operation for processing the data signal according to the mode signal.

2. The differential amplifier pair according to claim 1, wherein the transmit amplifier comprises:
    an amplification stage coupled to receive first and second data inputs; and
    a signaling stage coupled to the amplification stage and coupled to receive the mode signal, wherein the signaling stage is coupled to modify an output of the amplification stage in response to the mode signal.

3. The differential amplifier pair according to claim 2, wherein the amplification stage comprises:
    a first transistor coupled to a first node; and
    a second transistor coupled to the first node, wherein the output signal is derived from the first and second transistors.

4. The differential amplifier pair according to claim 3, wherein the signaling stage is coupled to the first node.

5. The differential amplifier pair according to claim 4, wherein the signaling stage comprises at least one variable current source, wherein the conductivity state of the at least one variable current source is controlled by the mode signal.

6. The differential amplifier pair according to claim 4, wherein the signaling stage comprises:
    a third transistor coupled to the first transistor; and
    a fourth transistor coupled to the second transistor.

7. The differential amplifier pair according to claim 1, wherein the transmit amplifier further comprises:
    an amplification stage, comprising:
        a first N-type Metal Oxide Semiconductor Field Effect Transistor (MOSFET); and
        a second N-type MOSFET;
        wherein the first N-type MOSFET and the second N-type MOSFET are connected in a common source configuration; and
    a signaling stage, comprising:
        a first P-type MOSFET comprising a drain connected to a drain of the first N-type MOSFET, a source connected to a reference voltage, and a gate connected to the mode signal;
        a second P-type MOSFET comprising a drain connected to a drain of the second N-type MOSFET, a source coupled to the reference voltage, and a gate connected to the mode signal;
    wherein an output of the amplifier comprises the drain of the first N-type MOSFET and the drain of the second N-type MOSFET; and
    wherein the mode signal controls the respective resistance values associated with the first and second P-type MOSFETs.

8. The differential amplifier pair according to claim 1, wherein the characteristic of the data signal is an extended run length of a continuous stream of same logic values.

9. The differential amplifier pair according to claim 1, wherein the characteristic of the data signal is a change in a type of coding used on the data signal.

10. The differential amplifier pair according to claim 1, wherein the characteristic of the data signal is a change in a type of scrambling used on the data signal.

11. The differential amplifier pair according to claim 1, wherein a first mode of operation uses differential data from the data signal as synchronization or signaling data; and
    wherein a second mode of operation uses differential data from the data signal as at least operational data.

12. A method of signal processing, the method comprising:
   determining a characteristic other than common mode of a differential data signal;
   generating a mode signal indicating the characteristic;
   adjusting the common mode of the differential data signal responsive to the mode signal; and
   transmitting the differential data signal with the adjusted common mode.

13. The method of claim 12, wherein the characteristic is an extended run length of a continuous stream of same logic values.

14. The method of claim 12, wherein the characteristic is a change in a type of coding used on the differential data signal.

15. The method of claim 12, wherein the characteristic is a change in a type of scrambling used on the differential data signal.

16. The method of claim 12, further comprising:
   receiving the differential data signal within a receiving system; and
   deriving the mode signal from the common mode of the differential data signal.

17. The method of claim 16, further comprising:
   within the receiving system, selecting one of a plurality of different modes of operation for processing the differential data signal according to the mode signal.

18. The method of claim 17, wherein a first mode of operation of the receiving system uses the differential data signal as synchronization or signaling data; and
   wherein a second mode of operation of the receiving system uses the differential data signal as at least operational data.

19. A receiving system, comprising:
   a receiver configured to receive a composite signal comprising a differential data signal and a common mode signal, wherein the receiver comprises:
      a low pass coupler configured to convert the common mode signal into one of a plurality of voltage values;
      an analog-to-digital converter coupled to the low pass coupler and configured to convert the voltage value into a digital control word; and
      a decoder configured to generate a control signal responsive to the digital control word, wherein the control signal selects one of a plurality of different modes of operation for processing the differential data signal within the receiving system.

20. The receiving system of claim 19, wherein a first mode of operation uses the differential data signal as synchronization or signaling data; and
   wherein a second mode of operation uses the differential data signal as at least operational data.

* * * * *